Oct. 20, 1959 K. B. KILBORN 2,908,936
METHOD AND APPARATUS FOR FINISHING MOLDED ARTICLES
Filed Sept. 12, 1955 3 Sheets-Sheet 1

INVENTOR.
KARL B. KILBORN
BY
R.L. Miller
ATTORNEY

Oct. 20, 1959 K. B. KILBORN 2,908,936
METHOD AND APPARATUS FOR FINISHING MOLDED ARTICLES
Filed Sept. 12, 1955 3 Sheets-Sheet 2

INVENTOR.
KARL B. KILBORN
BY
R. L. Miller
ATTORNEY

Oct. 20, 1959     K. B. KILBORN     2,908,936
METHOD AND APPARATUS FOR FINISHING MOLDED ARTICLES
Filed Sept. 12, 1955     3 Sheets-Sheet 3

INVENTOR.
KARL B. KILBORN
BY
R. L. Miller
ATTORNEY

United States Patent Office 2,908,936
Patented Oct. 20, 1959

2,908,936

METHOD AND APPARATUS FOR FINISHING MOLDED ARTICLES

Karl B. Kilborn, Akron, Ohio, assignor to The Goodyear Tire & Rubber Company, Akron, Ohio, a corporation of Ohio Application September 12, 1955, Serial No. 533,749

4 Claims. (Cl. 18—1)

This invention relates generally to a method for finishing molded articles and more particularly to a method for removing the overflow projections or flash from a molded elastomeric article.

In the manufacture of products such as shoe heels and the like, from elastomeric materials, the molding process results in an article having flash attached thereto. Heretofore the conventional method for cleaning such flash from the article has been confined to removing the flash by either manually-operated tools or power-driven cutting or grinding devices, or by lowering the temperature of the article to embrittle the projections and subsequently tumbling a batch of articles to remove the projections. In many applications, the latter process of tumbling is undesirable in that the final product surface is marred and scratched, resulting in an item which is not commercially acceptable.

The general object of the invention is to provide a method and apparatus for removing flash from a molded article whereby the surface of the finished article is not damaged by marring or scratching.

A further object of the invention is to provide a method and apparatus for removing overflow projections from a molded article that is simple and efficient in operation and advantageous in overall economy.

The aforesaid objects of the invention, and other objects which will become apparent as the description proceeds, are achieved by providing a method and apparatus for removing overflow projections from a molded article, wherein the temperature of the flash is lowered to produce therein a state of frangibility, and external pressure is then applied to the embrittled flash by introducing the article between a resiliently yielding cushion and preferably an unyielding backing-surface, and then applying a force upon the resulting assembly thereby causing the cushion to partially envelop the article and shear the flash therefrom.

Figure 1:
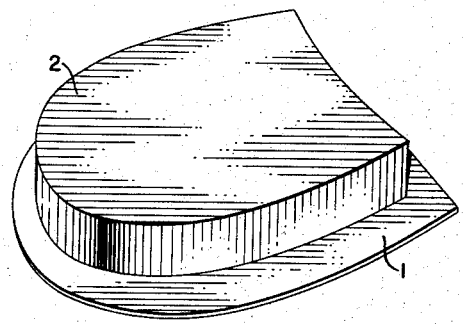
Fig. 1 is a pictorial representation of a shoe heel having flash attached thereto.

In Fig. 1 is shown, by way of example, a rubber shoe heel with flash attached, at the conclusion of the molding operation. The flash 1 is characteristic of the molding process utilized and is integral with the heel 2. By the term "flash," it is meant any unwanted projection on the article. It is to the efficient and economical removal of the flash 1 from the heel 2 that this invention is directed.

In the practice of the invention, the molded article of Fig. 1 is first placed in heat exchange relationship with a low-temperature medium to lower the temperature of the article. Specific instrumentalities to accomplish this are well-known in the art and may consist of cooling chests, liquid baths, and the like, all cooled to a low enough temperature to freeze the flash. As a result, the flash becomes embrittled and frangible which, as will become more apparent as the description proceeds, is necessary in the practice of the method of this invention. The optimum temperature level is, of course, dependent on the elastomeric composition utilized to mold the article. In practice it has been found that a mixture of liquid acetone and solid carbon-dioxide "ice" operates satisfactorily as a low temperature medium. Other media, compatible with the temperature level desired, inertness with respect to the elastomeric compound, etc., may also be utilized.

Figure 2:
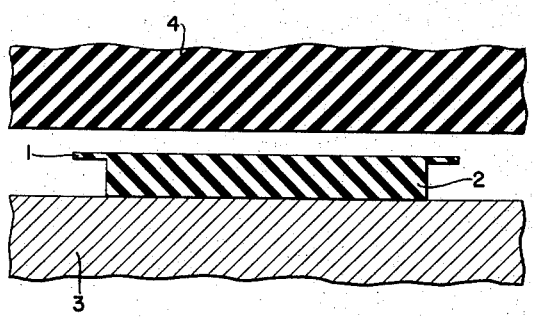
Fig. 2 is an elevation illustrating the practice of the invention and showing the heel in position preparatory to removing the flash.

As shown in Fig. 2, the heel 2 with the now embrittled flash (highly exaggerated in thickness proportioning for purposes of clarity in illustration) is located upon a surface of an unyielding support 3 of a material such as steel. Coextensive and oriented upwardly of the support 3 is a thick resilient cushion 4 suitably mounted for movement to and from the article. The cushion 4 may be of a material which remains resilient during the hereinafter described operations despite a lowering of temperature due to heat exchange with the article acted upon, or it may be heated to keep it above a temperature that would cause it to become embrittled and lose its resiliency.

Figure 3:
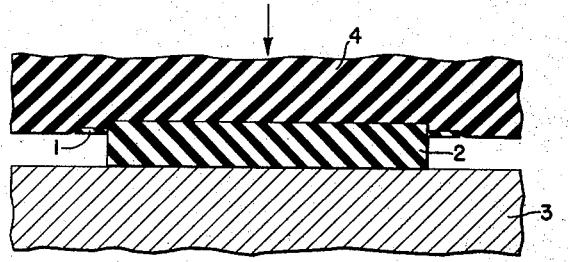
Fig. 3 is an elevation similar to Fig. 2 showing the heel during flash removal.
Figure 4:
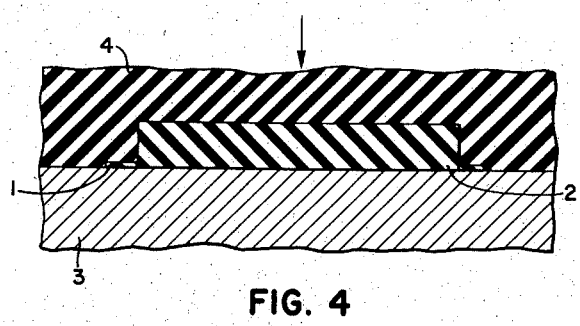
Fig. 4 is an elevation similar to Fig. 3 showing the heel at the conclusion of the flash removal process.

Upon proper placement of the heel 2, the cushion 4 is moved to bear upon the heel 2 as shown in Fig. 3. The compressive force is increased until the frangible flash 1 snaps free of the heel 2 (as shown in Fig. 3) and is then moved into the position shown in Fig. 4. Upon release of the compressive force the support 3 and cushion 4 may be separated by suitable means and the flash portion 1 discarded, leaving the heel 2 in finished form; unmarred and unscratched.

It will be obvious that the support 3 may also be composed of yieldable material similar to that of the cushion 4 and such an arrangement is desirable if flash is present on both sides of an article.

The method of the invention may be effected in various ways. A reciprocating press may be utilized to provide the forces acting on the support 3 and cushion 4. Again, the support 3 and cushion 4 may be the outer parts of two cooperating pressure creating rolls, with the molded articles passing therebetween in a continuous sequence.

Figure 5:
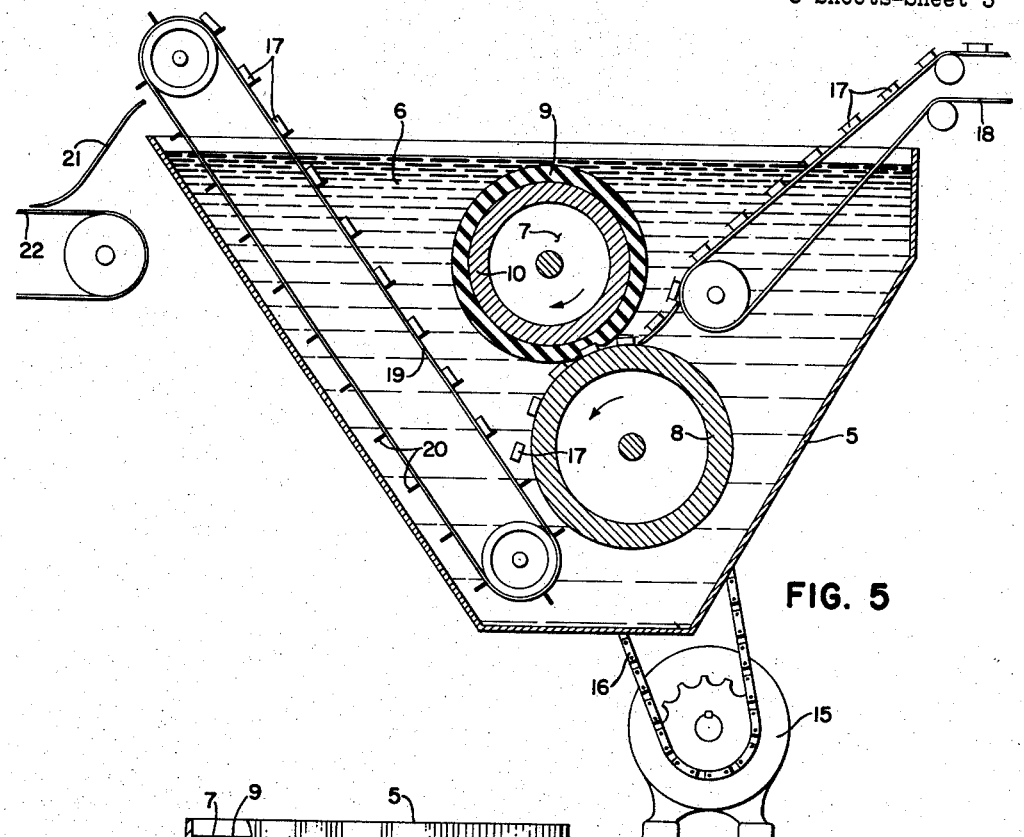
Fig. 5 is a vertical sectional view of apparatus utilizing the method of the invention.

A preferred embodiment utilizing the latter arrangement is shown in Fig. 5, wherein a sequential train is utilized in the method of the invention. A tank 5, filled with a low-temperature liquid medium 6 such as liquid carbon-dioxide, has two cylindrical rolls 7 and 8 extending through its width and suitably journaled in the tank sides. The roll 7 includes a resilient and yieldable cushion 9 adhered to the inner section 10 of the roll 7 by any means well known in the art. The roll 8 may be of non-resilient and rigid construction throughout or both rolls may be of resilient material. Both rolls are driven by external means to achieve the directional rotation indicated by the arrows.

Figure 6:
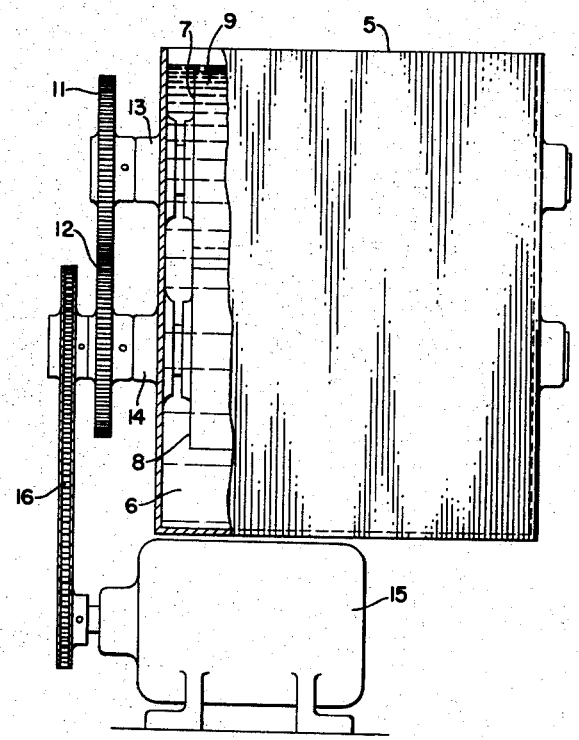
Fig. 6 is a fragmentary view, partly in section, of the driving means for the apparatus of Fig. 5.

Fig. 6 illustrates one of the various means of driving the apparatus of Fig. 5. Intermeshing spur gears 11 and 12 are provided at one extremity of the shafts carrying the rolls 7 and 8, respectively. The shafts of the rolls 7 and 8 are journaled as shown at the driving end in bearings 13 and 14 respectively, similar bearings (not shown) being provided at the other ends of said rolls. A motor 15 drives the roll 8 through a chain and sprocket drive 16 in a conventional manner. It will be understood that various other means for driving the rolls 7 and 8 may be utilized.

In operation, molded heels 17 (Fig. 5) are fed to the rolls 7 and 8 by a conveyor belt 18; the latter transporting the heels 17 beneath the surface of the liquid 6 and depositing them upon the roll 8. The relative rotation of the rolls 7 and 8 draws the heels 17 therebetween, and the flash, now in a fragible state due to the contact with the liquid 6, is sheared from the heels 17 as the cushion 9 tends to envelop the same. Thereafter the heels 17 drop to another conveyor 19, having suitable carrying lugs 20 thereupon, and are thereby transported out of the tank 5. The heels 17 are then discharged into and slide down a chute 21, and are deposited on a third conveyor 22 from which the finished articles may be removed.

Figure 7:
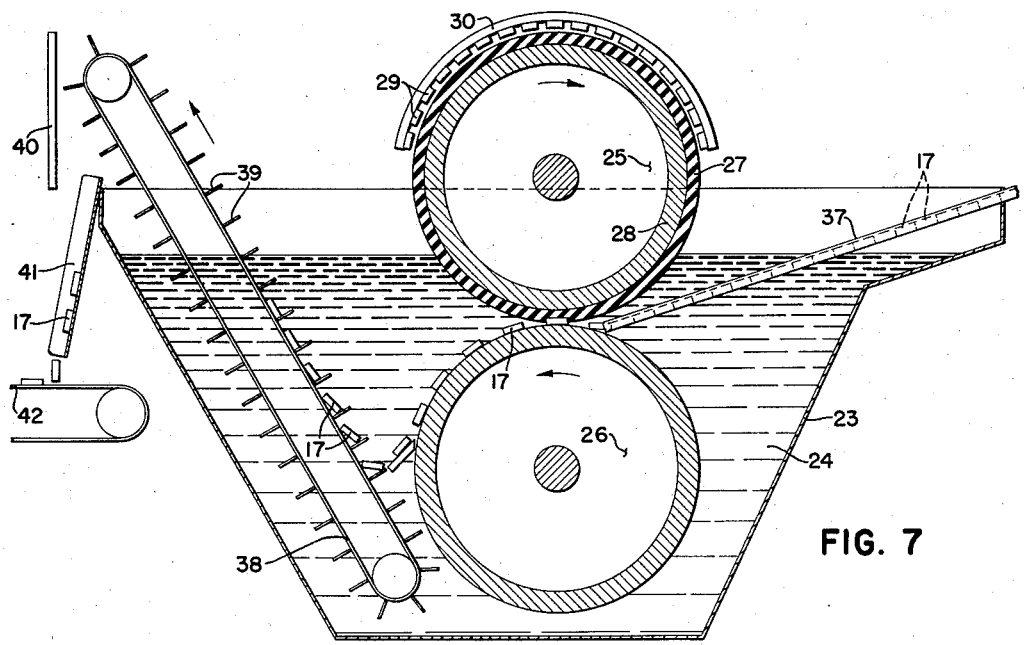
Fig. 7 is a vertical sectional view of another form of apparatus utilizing the method of the invention.

Another preferred embodiment utilizing cooperating rolls is shown in Fig. 7, wherein a sequential train, similar to that of Fig. 5, is utilized in the method of the invention. A tank 23 filled with a low-temperature liquid medium 24 has two cylindrical rolls 25 and 26 extending through its width and suitably journaled on the tank sides. The roll 25 includes a resilient and yieldable cushion 27 adhered to the inner section 28 of the roll 25 by any means well known in the art. The roll 26 may be of non-resilient and rigid construction throughout. Both rolls 25 and 26 are driven by external means to achieve the directional rotation indicated by the arrows. A bank of heating elements 29, suitably mounted on a support 30, may be provided for heating the cushion 27 when it is made of an elastomeric material possessing properties such that a temperature level, higher than that of the bath 24, need be maintained in the cushion 27 to provide for desirable resiliency and yieldability.

Figure 8:
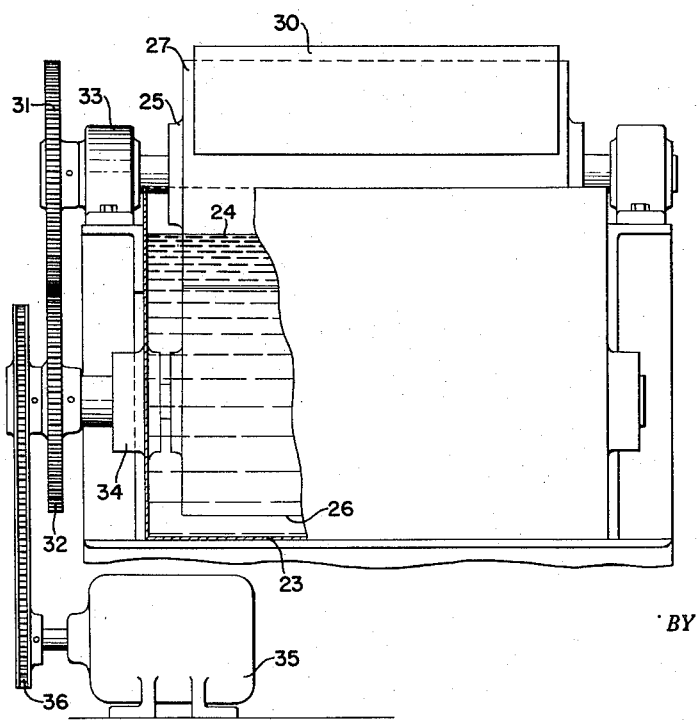
Fig. 8 is a fragmentary view, partly in section, of the driving means for the apparatus of Fig. 7.

Fig. 8 illustrates one of the various means of driving the apparatus of Fig. 7. Intermeshing spur gears 31 and 32 are provided at one extremity of the shafts which carry the rolls 25 and 26 respectively. The shafts of the rolls 25 and 26 are journaled on the tank as shown at the driving ends thereof by bearings 33 and 34, respectively; similar bearings (not shown) being provided at the other ends of said rolls. A motor 35 drives the roll 26 through a chain 36 in a conventional manner. Again, various other means of driving the rolls 25 and 26 may be utilized.

In operation, the molded heels 17 (Fig. 7) are placed in a chute 37, the latter transporting the heels 17 beneath the surface of the fluid 24 and depositing them upon the roll 26. The relative rotation of the rolls 25 and 26 draws the heels 17 therebetween, and the flash, now in a frangible state, due to the contact with the liquid 24, is sheared from the main body of the heels 17 by the envelopment thereof by the cushion 27. The heels 17 then drop to a conveyor 38 having suitable carrying lugs 39 thereupon, and are transported out of the tank 23, and, guided by a baffle 40 and chute 41, deposited on another "take-away" conveyor 42, from which the finished heels may be removed. A major advantage of the embodiment of Fig. 7 over that shown in Fig. 5 is the removal of the journaling arrangements for the top roll from a position below the liquid bath level thus simplifying mechanical construction and design.

It will be understood that the element of time is highly important in the method of the invention. Embrittlement may be effectively confined to the flash portion by regulating the length of travel and the time of contact in the embodiments hereinbefore described. By restricting the freezing of the article to the flash portion itself, not only are the chances of the article being broken considerably lessened, but also, from an energy standpoint, savings result from the increased working life of the liquid bath itself.

From the foregoing, it will be recognized that the objects of the invention have been achieved by the method and apparatus of the invention wherein the molded product is deflashed with minimum effort and time and in a manner avoiding unsightly surface conditions and consequent high reject waste and increased costs.

As used in the claims the term "flash" means a relatively thin member integral with an adjacent body of substantially greater thickness. Such a flash is to be distinguished from a layer which is of substantially the same thickness as an adjacent body of the material. The flash is formed by the flow of material into the parting between mold sections. This flash cannot readily be torn from the main body of rubber without leaving a ragged edge or tearing a part of the rubber from the molded article. It could be cut from the article as by a scissors, or a clicking die. If clicking dies were used, a separate die would have to be used for each different shape of the article that is being produced. With the present invention articles of different sizes and shapes may have the flash removed without changing the mechanism.

While certain representative embodiments and details have been shown for the purpose of illustrating the invention, it will be apparent to those skilled in this art that various changes and modifications may be made therein without departing from the spirit or scope of the invention.

I claim:

1. An apparatus for removing flash from a molded elastomeric article comprising liquid heat removing means in heat exchange relationship with at least the flash on the article to lower the temperature of said flash to produce a state of frangibility therein without embrittling the body of the article, a first roll, a second roll cooperating with the first roll with at least one of the rolls having a deformable and resiliently yieldable exterior surface to engage the flash and at least partially envelop the article while progressing therebetween to shear the flash from the article, and heating means to maintain the deformable and resilient characteristics of said exterior surface.

2. An apparatus for removing flash from a molded elastomeric article comprising liquid heat removing means in heat exchange relationship with at least the flash on the article to lower the tempearture of said flash to produce a state of frangibility therein without embrittling the body of the article, a first roll, a second roll cooperating with the first roll with at least one of the rolls having a deformable and resiliently yieldable exterior surface, heating means to maintain the deformable and resilient characteristics of said exterior surface, and means for presenting the article to the first and second rolls to progress the article therebetween to engage the flash and at least partially envelop the article to shear the flash from the article.

3. An apparatus for removing flash from a molded elastomeric article comprising a container, a liquid medium in the container, means for maintaining the liquid medium at a temperature level sufficient to produce a state of frangibility in said flash without embrittling the body of the article, a first roll totally immersed in the liquid medium and rotatably mounted and journaled in the container, a second roll partially immersed in the liquid medium and cooperatingly synchronized with the first roll, with at least one of said rolls having a deformable and resiliently yieldable exterior surface, heating means to maintain the deformable and resilient characteristics of said exterior surface, means for presenting the article to the first and second rolls to progress the article therebetween to engage the flash and at least partially envelop the article to shear the flash from the article, and means for subsequently removing the article from the container.

4. The method of removing flash from a molded elastomeric article comprising the steps of continuously transporting the article through a liquid cooling medium while maintaining it in heat exchange relationship therewith at a sufficiently low temperature and for a sufficient time to embrittle the flash completely without embrittling the article, inserting said article between two opposed members, at least one of which is deformable and resiliently yieldable, supplying heat to said one member to maintain the deformable characteristics thereof, positioning said article in such a manner to permit the yieldable member to engage the flash, and applying an external pressure to the resulting assembly to move said yieldable member into engagement with the flash and to partially envelop the article to break the flash therefrom.

References Cited in the file of this patent

UNITED STATES PATENTS

| | | |
|---|---|---|
| 237,221 | Westervelt | Feb. 1, 1881 |
| 1,382,207 | McGuire | June 21, 1921 |
| 1,739,761 | Kleinfeldt | Dec. 17, 1929 |
| 2,280,259 | Polley | Apr. 21, 1942 |
| 2,342,443 | Wood | Feb. 22, 1944 |